United States Patent [19]

Higuchi et al.

[11] Patent Number: 4,642,500
[45] Date of Patent: Feb. 10, 1987

[54] CONTROL ARRANGEMENT FOR MAGNETIC BEARING APPARATUS

[75] Inventors: Toshiro Higuchi, Yokohama; Takeshi Mizuno; Noboru Aikawa, both of Tokyo, all of Japan

[73] Assignee: Seiko Seiki Kabushiki Kaisha, Tokyo, Japan

[21] Appl. No.: 815,674

[22] Filed: Jan. 2, 1986

Related U.S. Application Data

[63] Continuation of Ser. No. 682,811, Dec. 18, 1984, abandoned, which is a continuation of Ser. No. 439,325, Nov. 4, 1982, abandoned.

[30] Foreign Application Priority Data

Nov. 11, 1981 [JP]  Japan .................................. 56-180712

[51] Int. Cl.$^4$ ............................................. F16C 39/06
[52] U.S. Cl. .................................... 310/90.5; 74/5.46
[58] Field of Search ................... 310/90.5; 74/5.46, 5.5

[56] References Cited

U.S. PATENT DOCUMENTS

| | | | |
|---|---|---|---|
| 3,458,239 | 7/1969 | Dorsman | 308/10 |
| 4,053,369 | 11/1977 | Isenberg | 308/10 |
| 4,080,012 | 3/1978 | Boden | 308/10 |
| 4,167,296 | 9/1979 | Dendy | 74/5.46 |
| 4,180,946 | 1/1980 | Heijkensjold | 308/10 |
| 4,300,807 | 11/1981 | Pobeau | 308/10 |
| 4,353,602 | 10/1982 | Habermann | 308/10 |

FOREIGN PATENT DOCUMENTS 2149644  3/1973  France .................................. 308/10

OTHER PUBLICATIONS

J. S. Rao, "Rotor Dynamics"; 1983; John Willey & Sons; New York.

Primary Examiner—R. Skudy
Attorney, Agent, or Firm—Robert E. Burns; Emmanuel J. Lobato; Bruce L. Adams

[57] ABSTRACT

An electromagnetic bearing apparatus having five degrees of freedom includes two radial magnetic bearings. Each of the radial bearings consists of two pairs of electromagnets. The electromagnets of one pair are arranged opposite one another around a rotating shaft, and the other pair is arranged in the same perpendicular plane as the preceding pair. The pairs of electromagnets in the two radial bearings are respectively controlled to stabilize the rotating shaft to obtain automatic regulation, in which deviation of the shaft in a radial sense is compensated according to the component of shaft radial deviation and deviating velocity and the gyro-effect which will be caused by the perpendicular compensating torque to compensate the future rotation in the perpendicular component.

2 Claims, 9 Drawing Figures

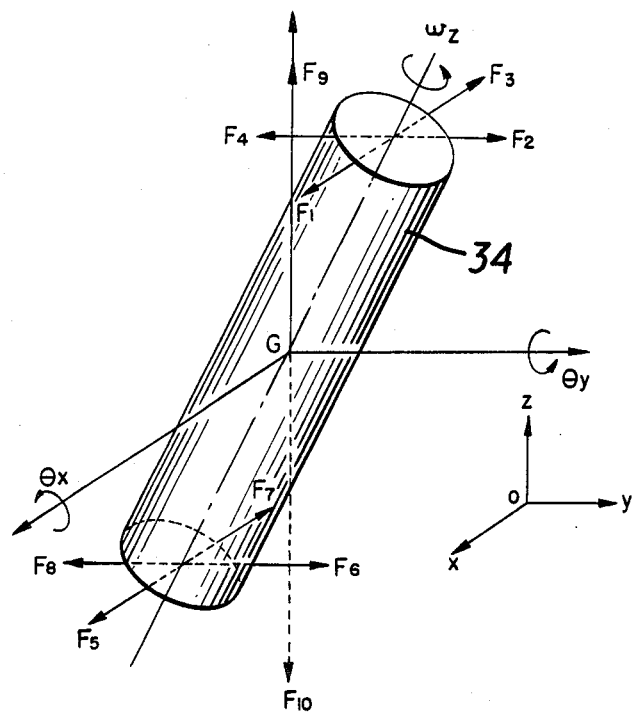
FIG. 5
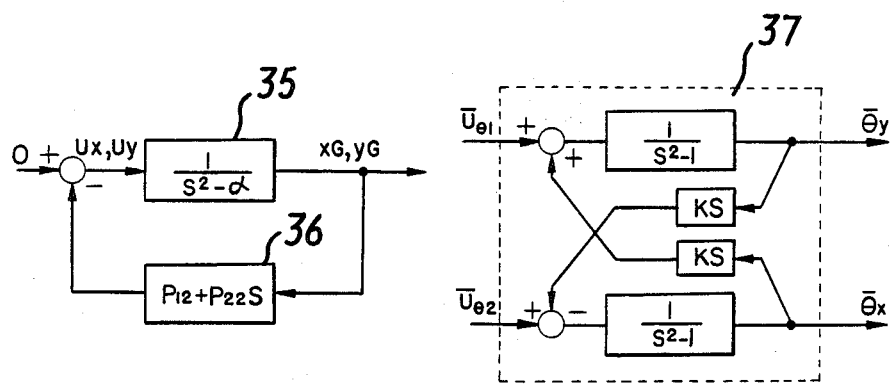
FIG. 6
FIG. 7

CONTROL ARRANGEMENT FOR MAGNETIC BEARING APPARATUS

CROSS-REFERENCE TO RELATED APPLICATIONS

This is a continuation of application Ser. No. 682,811 filed Dec. 18, 1984 (now abandoned) which, in turn, is a continuation of application Ser. No. 439,325 filed Nov. 4, 1982 (now abandoned).

BACKGROUND OF THE INVENTION

The present invention relates to an electromagnetic bearing apparatus having five degrees of freedom for use in a turbo molecular pump, a spindle of a working machine or the like.

FIG. 1 is a view showing the general structure of a five degrees of freedom control type magnetic bearing of conventional construction. In FIG. 1, 1 is an axis position sensor for detecting the position of a rotating body 2 in the axis direction, 3 is a target corresponding to the axis position sensor 1 mounted on the rotating body 2, 4 is a motor for rotating the rotating body 2, 5 is an armature disc mounted on the rotating body 2, 6 is an axis direction electromagnet for providing an axis direction controlling force to the armature disc 5, 7 and 8 are radial direction magnetic bearings, and 9 and 10 are radial direction position sensors.

FIG. 2 is an embodiment of a prior art control system for the five degrees of freedom control type magnetic bearing arranged as shown in FIG. 1. The arrangement of the control system is disclosed in French Pat. No. 2149644 in which the translating movement parallel with the rotating axis of the rotating body and the rotating movement with respect to the center of mass of the rotating body are controlled individually. In the drawing, 11 is an adder for a pair of radial direction position sensors $X_1$ and $X_1'$ or $X_2$ and $X_2'$ and 12 is an adder for carrying out the adding operation for the output from the adders 11. The output from the adder 12 is indicative of the translating movement in the X axis direction and is applied to a phase advance compensating circuit 13. The output from the phase advance compensating circuit 13 is applied to adders 14 and 19 whose outputs control a power amplifier 29 by which electromagnet coils $A_1$, $A_1'$, $A_2$ and $A_2'$ are driven. In a similar way, a control device for restricting the translating movement in the Y direction comprises adders 20 and 21, a phase advance compensating circuit 22, adders 23 and 28 and the power amplifier 29 to control the power supplied to electromagnet coils $B_1$, $B_1'$, $B_2$ and $B_2'$.

A signal component of the movement around the center of mass of the rotating body is obtained by adding the output of an inverter 15 to the output of the adder 11 for the radial direction detectors $X_2$ and $X_2'$ by the use of an adder 16. The output of the adder 16 is applied to a wide band phase advance compensating circuit 17 whose output drives the electromagnet coil $A_1$ or $A_1'$ and the electromagnet coil $A_2$ or $A_2'$ is driven by the output of an inverter 18. The movement rotating about the Y axis at the center of the mass of the rotating body is restricted by the control device mentioned above. In a similar way, the movement control around the X axis is carried out by the control device composed of the adder 20, an inverter 24, a wide band phase advance compensating circuit 26, an inverter 27 and the power amplifier 29. The electromagnetic coil $B_1$ or $B_1'$ is driven by the output of the power amplifier 29 and the electromagnetic coil $B_2$ or $B_2'$ is driven by the output of the inverter 27 whereby to attain the desired control.

In order to carry out the restriction control in the Z axis direction, that is, the thrust direction of the rotating body, the signals of the axis direction position detectors $Z_1$ and $Z_2$ are applied to an adder 30 and the control signal corresponding to the signal is produced by a phase advance compensating circuit 31. An electromagnet coil $C_2$ is driven by controlling a power amplifier 29' in accordance with the control signal mentioned above, and the output of the phase advance compensating circuit 31 is applied to the inverter 32. The power amplifier 29' is controlled by the output signal to drive the electromagnet coil $C_1$. As a result, the restriction control along the Z axis is attained.

The meanings of the symbols $X_1$, $X_1'$, ... $A_1$, $A_1'$... used for explaining the control block diagram shown in FIG. 2 are illustrated in FIG. 3. In FIG. 3, 33 is a rotating body, $P_1$, $P_2$ are radial direction magnetic bearings, and $P_3$ is an axis direction magnetic bearing. $A_1$, $A_1'$ designate the mounting positions of vertical direction electromagnet coils for the radial direction magnetic bearing and $B_1$ and $B_1'$ designate the mounting positions of horizontal direction electromagnet coils for the radial direction magnetic bearing. $C_1$ and $C_2$ designate the mounting positions of electromagnet coils for the axis direction magnetic bearing $P_3$. In FIG. 3, the directions of the arrows indicate the direction of electromagnetic force. $X_1$ and $X_1'$ form a pair of position detectors which are structural members of the bearing $P_1$ and placed in the vertical direction. $Y_1$ and $Y_1'$ form a pair of position detectors which are placed in the horizontal direction. Similarly, $X_2$ and $X_2'$, and $Y_2$ and $Y_2'$ are pairs of position detectors by which the bearing $P_2$ is arranged and $Z_1$ and $Z_2$ is a pair of position detectors by which the bearing $P_3$ is arranged.

With the arrangement of the control block shown in FIG. 2, it is possible to control three translating movements other than the movements around the rotating axis of the rotating body and two rotating movements around the center of the mass. However, when the precession and the nutation occurs in the rotating body due to a gyro effect, the aforedescribed arrangement is not so effective as to control it. The reasons for this are as follows. For example, when the rotating motion around the X axis occurs due to the influence of the gyro effect during the high speed rotation of the rotating body 33, the rotating body 33 starts to rotate around the Y axis. However, in the control system shown in FIG. 2, no control for suppressing this effect is taken into consideration.

SUMMARY OF THE INVENTION

An object of the present invention to provide a control system which is able to quickly suppress the precession and the nutation due to the gyro effect. The control system of the present invention has been achieved by applying thereto the optimum regulator problem taught by modern control theory, and excellent results have been obtained by noting the interior structure of the object to be controlled in the analysis.

BRIEF EXPLANATION OF THE DRAWINGS

FIG. 5 is an explanatory view illustrating a coordinate system which is used in the analysis, FIG. 6 is a view illustrating the optimum regulator of a one degree of freedom system, FIG. 7 is a circuit diagram showing the structure of the inside of an object to be controlled.

DETAILED DESCRIPTION OF THE INVENTION

Figure 1:
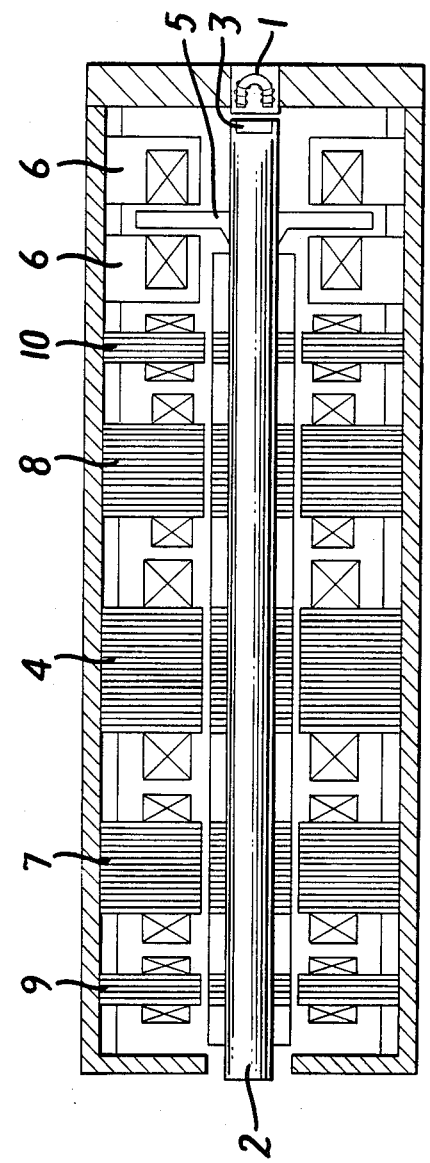
FIG. 1 is a structural view showing a common prior art structure of the magnetic bearing for controlling five degrees of freedom.
Figure 2:
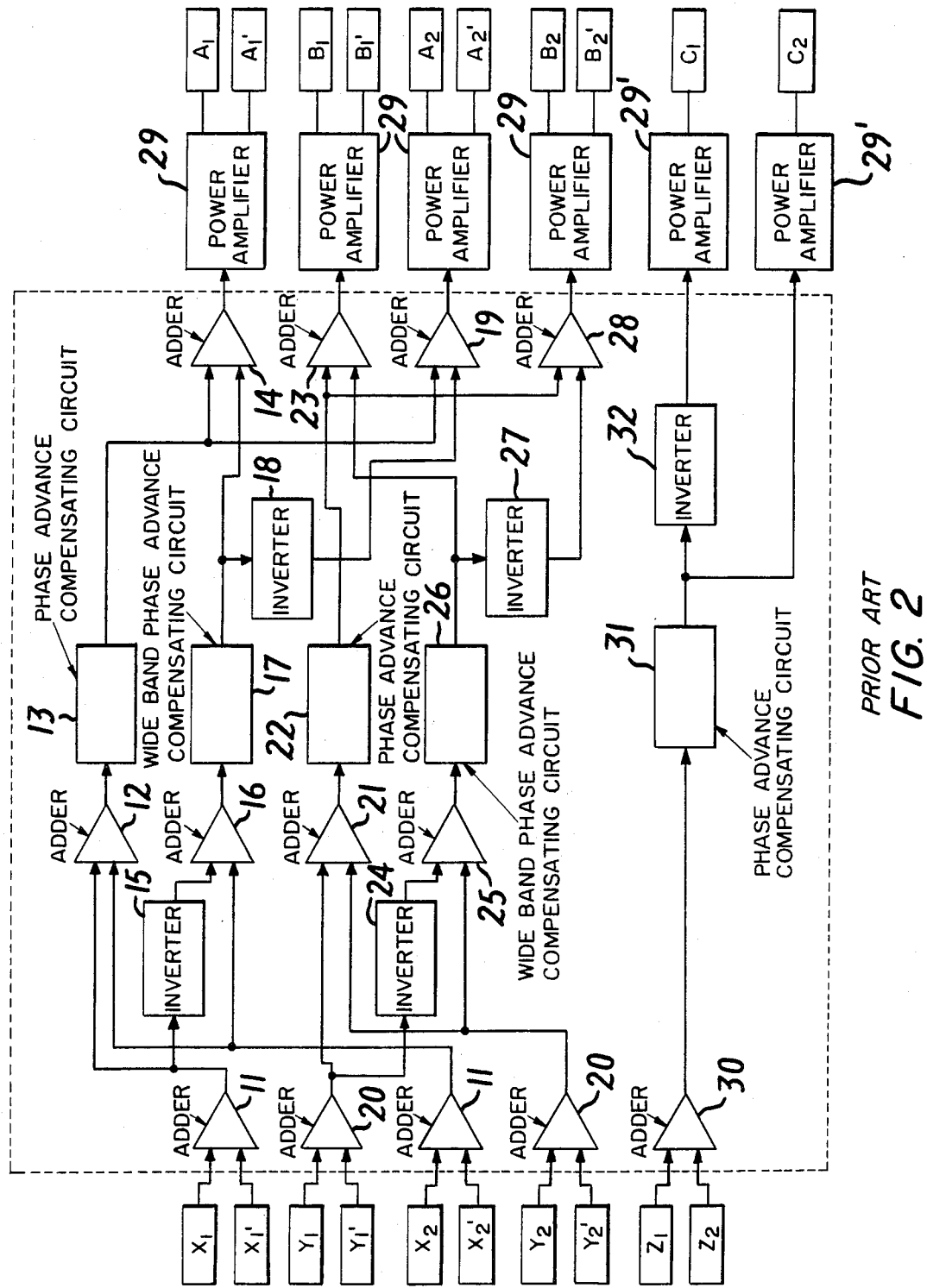
FIG. 2 is a circuit diagram showing a prior art control system.
Figure 3:
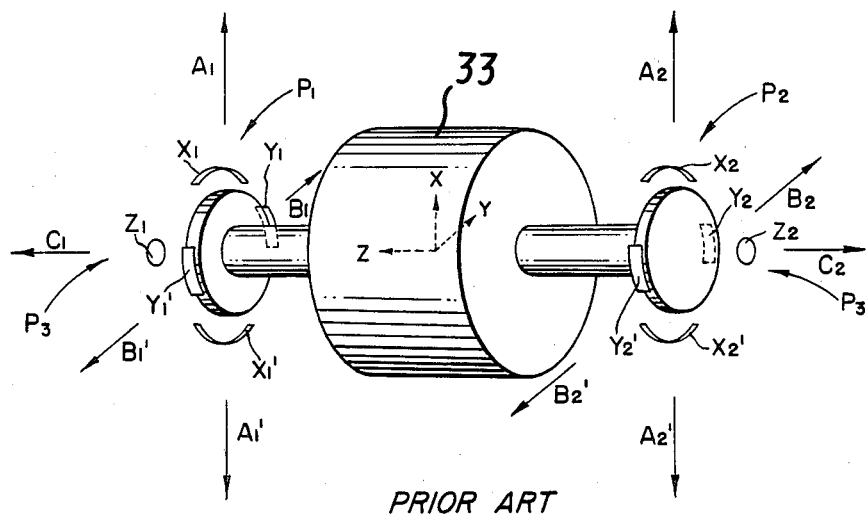
FIG. 3 is an explanatory view of a part of the prior art structure shown in FIG. 2 showing the mounting position of an electromagnetic coil or a position sensor.
Figure 4:
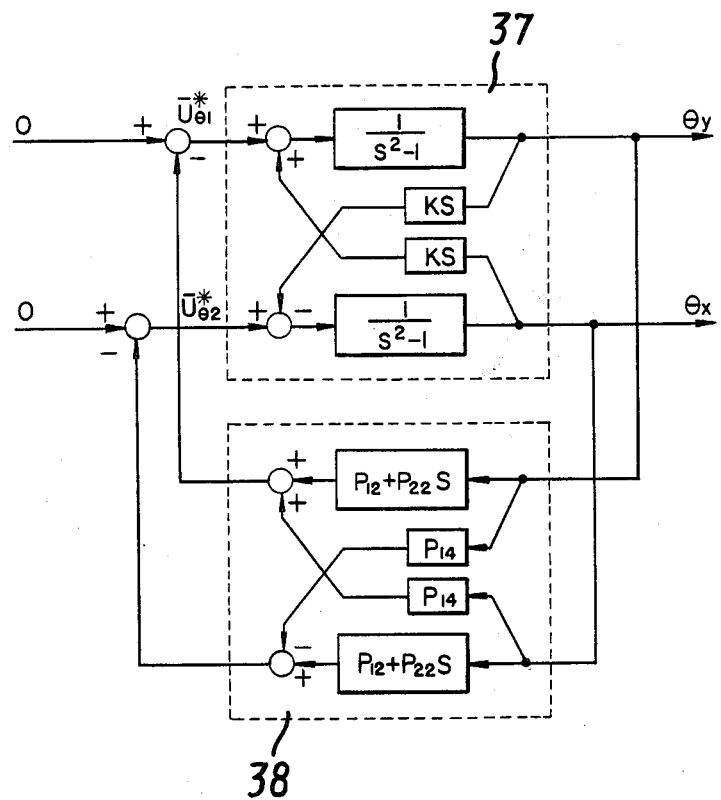
FIG. 4 is a circuit diagram showing the optimum feedback mechanism of the present invention.

In FIG. 4, there is shown a block diagram of the control system of the present invention which enables attenuation of the precession and the nutation of a controlled object 37.

The analysis used to obtain the block diagram shown in FIG. 4 will be described hereinafter.

In FIG. 5, a rotating body 34 comprises an axial symmetric rigid body which is symmetric with respect to the center of mass G and the body 34 rotates around the rotating axis at a constant angular speed $\omega_z$ by means of a motor. The coordinate system O-XYZ is determined in such a way that the position of the center of mass G of the rotating body 34 when it is balanced is selected as an origin and the rotating axis is coincident with the Z axis. When the attracting force of an electromagnet is represented by $F_k$ ($k=1, \ldots, 10$), the equation of motion for the rotating body 34 will be written as follows if the high-order terms more than $\theta_x^2$ and $\theta_y^2$.

$$m\ddot{x}_G = F_1 - F_3 + F_5 - F_7 \quad (1)$$

$$m\ddot{y}_G = F_2 - F_4 + F_6 - F_8 \quad (2)$$

$$m\ddot{z}_G = F_9 - F_{10} \quad (3)$$

$$I_r\ddot{\theta}_y - I_a\omega_z\dot{\theta}_x = l(F_1 - F_3 - F_5 - F_7) \quad (4)$$

$$I_r\ddot{\theta}_x + I_a\omega_z\dot{\theta}_y = l(-F_2 + F_4 + F_6 - F_8) \quad (5)$$

Where,
- m: mass of the rotating body,
- $I_a$: moment of inertia around the rotating axis
- $I_r$: moment of inertia around the diameter through the center of mass G
- ($x_G, y_G, z_G$): coordinates of the center of mass G of the rotating body
- l: distance between the center of mass G and the point of application of the electromagnetic force
- ($\theta_x, \theta_y$): magnitude of the angular displacement around the X and Y axes of the rotating body
- F: electromagnetic force ($F_1, F_2 \ldots F_{10}$ as shown in FIG. 5)

The attracting force F of the electromagnet is expressed as follows:

$$F = Ki^\rho/d^\sigma \quad (K>0, \rho>1, \sigma>1) \quad (6)$$

where,
- d: gap between the electromagnet and the rotating body
- i: exciting current for the electromagnet Expanding the foregoing equation in the vicinity of the balanced condition, the following equation will be given.

$$F = \bar{F} + K_i\Delta_i - K_d\Delta_d \quad (7)$$

wherein,
$\bar{F} = K\bar{i}^\rho/\bar{d}^\sigma$
$K_i = \rho K\bar{i}^{\rho-1}/\bar{d}^\sigma$
$K_d = \sigma K\bar{i}^\rho/\bar{d}^{\sigma+1}$
$\Delta_i$ = the amount of infinitesimal change in i
$\Delta_d$: the amount of infinitesimal change in d
$K, \rho, \sigma$: constants If the equation (7) is applicable to any electromagnet and the amount of change in the exciting current of each electromagnet is represented by $i_k$ ($k=1, 2, \ldots, 10$), the equations (1) to (5) will be written as:

$$\dot{x} = Ax + Bu \quad (8)$$

where,
$x = [x_x^T, x_\theta^T, x_y^T]^T$
$x_x = [x_G, \dot{x}_G]^T$
$x_\theta = [\theta_y, \dot{\theta}_y, \theta_x, \dot{\theta}_x]^T$
$x_y = [y_G, \dot{y}_G]^T$
$u = [i_1 - i_3, i_5 - i_7, i_2 - i_4, i_6 - i_8]^T$ $$A = \begin{bmatrix} A_p & 0 & 0 \\ 0 & A_\theta & 0 \\ 0 & 0 & A_p \end{bmatrix} \quad A_p = \begin{bmatrix} 0 & 1 \\ 4K_d/m & 4K_d/m \end{bmatrix}$$

$$A_\theta = \begin{bmatrix} 0 & 1 & 0 & 0 \\ 4K_d l^2/I_r & 0 & 0 & \omega_z I_a/I_r \\ 0 & 0 & 0 & 1 \\ 0 & -\omega_z I_a/I_r & 4K_d l^2/I_r & 0 \end{bmatrix}$$

$$B = \begin{bmatrix} 0 & K_i/m & 0 & K_i l/I_r & 0 & 0 & 0 & 0 \\ 0 & K_i/m & 0 & -K_i l/I_r & 0 & 0 & 0 & 0 \\ 0 & 0 & 0 & 0 & 0 & -K_i l/I_r & 0 & K_i/m \\ 0 & 0 & 0 & 0 & 0 & K_i l/I_r & 0 & K_i/m \end{bmatrix}$$

Now, consider the problem in which the input variable u(t) to minimize the following quadratic relationship of an estimating function when the object to be controlled is in any initial state x(0):

$$Jc = \int_0^\infty (x^T Q x + u^T R u) \, dt \quad (9)$$

Where,
- Q: non-negative definite matrix
- R: positive definite matrix

If the symmetricity of the system is considered, it is reasonable to select the following form:

$$Q = \text{diag}(q_d, q_v, q_\theta, q_\omega, q_\theta, q_\omega, q_d, q_v) \quad (10)$$

$$R = \text{diag}(r, r, r, r)$$

$$q_d, q_v, q_\theta, r > 0$$

If the input variable is rewritten as follows:

$$\tilde{u} = [(i_1-i_3)+(i_5-i_7), (i_1-i_3)-(i_5-i_7), \\ -(i_2-i_4)+(i_6-i_8), (i_2-i_4)+(i_6-i_8)]^T \quad (11)$$

and the equations (8) and (9) are also rewritten, the problem of the optimum regulator of the system described by the equation (8) may be two optimum regulator problems of a one degree of freedom system and an optimum regulator problem of a two degrees of freedom system.

In this case, if $A_p$, $b_p$, $u_p$, $Q_p$ and r are properly set with respect to the axis direction of the rotating body, it is easy to derive that these problems become the optimum regulator problem of a one degree of freedom system.

When the object to be controlled is described by the following equation, $$\dot{x}_p = A_p x_p + b_p u_p \qquad (12)$$

the problem of the optimum regulator of a one degree of freedom system is equal to the problem of finding the $u_p$ to minimize the following estimating function:

$$J_p = \int_0^\infty \left( x^T q_p x_p + \frac{\gamma}{2} u_p^2 \right) dt \qquad (13)$$

wherein,
when $x_p = x_x$, $U_p = i_1 - i_3 + i_5 - i_7$
when
$x_p = x_y$, $u_p = i_2 - i_4 + i_6 - i_8$
$b_p = [0, K_i/m]^T$, $Q_p = \text{diag}(q_d, q_v)$
when $4K_d/m = \alpha$, $K_i/m = \beta$, $2q/r = \gamma d$, $2q/r = \gamma v$,
the input $u_p$ for minimizing the value of $J_p$ will be given as the following equation.
where, $$u_p = -[P_{12}, P_{22}]X_p \qquad (14)$$

$$P_{12} = (\alpha + \sqrt{\alpha + \beta^2 \gamma d})/\beta, \quad P_{22} = \sqrt{2P_{12} + \gamma v}$$

Therefore, the optimum regulator of one degree of freedom will be the arrangement shown in FIG. 6. In the figure, 35 is an object to be controlled, and 36 is a feedback compensator for producing a feedback control signal corresponding to the radial displacement or deviation of the controlled object 35. In this optimum regulator system, the feedback for the displacement and the speed is applied to the object 35 which has an unstable pole $S = +\sqrt{\alpha}$. As a result, the system comes to the stable state having a proper attenuation characteristics. The magnitude of the attenuation is adjustable by the selection of the weight matrix. The optimum regulator of the translating movement of Z axis direction about $Z_G$ is same as in the aforemention.

On the other hand, when the object to be controlled is described as $$\dot{x}_p = A_\theta x_\theta + B_\theta u_\theta \qquad (15)$$

the problem of the optimum regulator of a two degrees of freedom is equal to the problem of finding the $u_\theta$ for minimizing the following evaluating function:

$$J_\theta = \int_0^\infty \left( x_\theta^T Q_\theta x_\theta + \frac{\gamma}{2} u_\theta^T u_\theta \right) dt \qquad (16)$$

wherein, $$u_\theta = [i_1 - i_3 - i_5 + i_7, -i_2 + i_4 + i_6 - i_8]^T$$

$$B_\theta = \begin{bmatrix} 0 & K_i l/I & 0 & 0 \\ 0 & 0 & 0 & K_i l/I \end{bmatrix}$$

$$Q_\theta = \text{diag}(q_\theta, q_\omega, q_\theta, q_\omega)$$

The problem of the optimum regulator of two degrees of freedom system is related to a gyro effect which occurs at the rotating body. The arrangement of the optimum regulator will now be described.

For providing a common solution, the following reference relations, $$t_0 \overset{\Delta}{=} \sqrt{I_r/4K_d l^2} \qquad (17)$$

$$Q_0 \overset{\Delta}{=} \bar{d}/l$$

$$i_0 \overset{\Delta}{=} 4K_d \bar{d}/K_i = 4\sigma i/\rho$$

are used, and the orderless variables $\bar{t}(\underline{\Delta} t/t_0)$, $\bar{\theta}_x(\underline{\Delta}\theta_x/\theta_0)$, $\bar{\theta}_y(\underline{\Delta}\theta_y/\theta_0)$, $\bar{u}(\underline{\Delta} u_\theta/i_0)$.

When the dynamic characteristics of the object to be controlled is described as $$\dot{\bar{X}}_\theta = \bar{A}_\theta \bar{X}_\theta + \bar{B}_\theta \bar{u}_\theta \qquad (18)$$

the control input $u_\theta(\bar{t})$ can be found by minimizing the following evaluating function:

$$J_\theta = \int_0^\infty (\bar{X}_\theta^T \bar{Q}_\theta \bar{X}_\theta + \bar{u}_\theta^T \bar{R}_\theta \bar{u}_\theta) d\bar{t} \qquad (19)$$

where:

$$\bar{X}_\theta = [\bar{\theta}_y, \dot{\bar{\theta}}_y, \bar{\theta}_x, \dot{\bar{\theta}}_x]^T, \quad \bar{u}_\theta = [\bar{u}_{\theta 1}, \bar{u}_{\theta 2}]^T$$

$$\bar{A}_\theta = \begin{bmatrix} 0 & 1 & 0 & 0 \\ 1 & 0 & 0 & k \\ 0 & 0 & 0 & 1 \\ 0 & -k & 1 & 0 \end{bmatrix} \quad \bar{B}_\theta = \begin{bmatrix} 0 & 0 \\ 1 & 0 \\ 0 & 0 \\ 0 & 1 \end{bmatrix}$$

$$k \overset{\Delta}{=} t_0 \omega_z I_a/I_r$$

$$\bar{Q}_\theta = \text{diag}(\bar{q}_\theta, \bar{q}_\omega, \bar{q}_\theta, \bar{q}_\omega)$$

$$\bar{q}_\theta \overset{\Delta}{=} t_0 \theta_0^2 q_\theta, \quad \bar{q}_\omega = \theta_0^2 q_\omega$$

$$R_\theta = \text{diag}(i_0^2 r/2, i_0^2 r/2)$$

Since $i_0^2 r/2 > 0$, the following relationship will be established without losing the generality:

$$\bar{R}_\theta = \text{diag}(1, 1)$$

When the positive solution for a constant value of the following $$\bar{P}A_\theta + \bar{A}_\theta^T P - P\bar{B}_\theta \bar{R}_\theta^{-1} \bar{B}_\theta^T P + \bar{Q}_\theta = 0 \qquad (20)$$

the optimum input $\bar{u}_\theta^*$ for minimizing $J_\theta$ is expressed as the following expression:

$$\bar{u}_\theta^*(\bar{t}) = -\bar{R}_\theta^{-1} \bar{B}_\theta^T P \bar{X}_\theta(\bar{t}) \qquad (21)$$

Therefore, for closed loop systems, it will be written as:

$$\dot{\bar{X}}_\theta = (\bar{A}_\theta - \bar{B}_\theta \bar{R}_\theta^{-1} \bar{B}_\theta P) \bar{X}_\theta \qquad (22)$$

In general, although the solution of the equation (22) is found by numerical calculation, the resulting solution is not so useful for finding the physical meaning. In this analysis, the solution is found by noting the structure of the inside of the system following which an excellent solution is obtained. If the equation (21) is expressed by the use of each component of the matrix, it will be as follows:

$$\ddot{\bar{\theta}}_y - k\dot{\bar{\theta}}_x - \bar{\theta}_y = -P_{12}\bar{\theta}_y - P_{22}\dot{\bar{\theta}}_y - P_{23}\bar{\theta}_x - P_{24}\dot{\bar{\theta}}_x \qquad (23)$$

$$\ddot{\bar{\theta}}_x + k\dot{\bar{\theta}}_y - \bar{\theta}_x = -P_{34}\bar{\theta}_x - P_{44}\dot{\bar{\theta}}_x - P_{14}\bar{\theta}_y - P_{24}\dot{\bar{\theta}}_y \qquad (24)$$

However, as P is a symmetrical matrix, each component of P is shown only by the upper triangular elements. The equations (23) and (24) show a system having an inverse symmetrical cross-linking in which the systems each of which has the same transfer function $1/(s^2-1)$ are linked through transfer elements having an opposite sign with respect to each other. This state is shown in FIG. 7. In the relation for minimizing the input energy required for the control in response to the structure of the inside of such a controlled object 37, the optimum state feedback compensating mechanism has also a similar structure. That is, $$P_{12} = P_{14}, P_{22} = P_{44}, P_{23} = -P_{14} \qquad (25)$$
$$P_{24} = 0$$

Substituting the equation (25) for the equation (20) and clearing it, $P_{12}$, $P_{22}$ and $P_{14}$ can be obtained. If these solutions are expressed as $P_{12}^*$, $P_{22}^*$ and $P_{14}^*$, $P_{12}^*$ is the roots of the following equation $$2P_{12}{}^3 + (k^2 + \bar{q}_\omega - 4)P_{12}{}^2 - 2(\bar{q}_\theta + \bar{q}_\omega)P_{12} - \bar{q}_\theta \bar{q}_\omega = 0 \qquad (26)$$

and should satisfy the following relationship:

$$0 < P_{12}^* \leq 1 + \sqrt{1 + \bar{q}_\theta} \qquad (27)$$

Also, $$P_{22}^* = \sqrt{2P_{12}^* + \bar{q}_\omega} \qquad (28)$$

$$P_{14}^* = \text{Sgn}(k)\sqrt{2P_{12}^* - P_{12}^{*2} + \bar{q}_\theta}$$

As a result, the optimum regulator will be a structure as shown in FIG. 4. In the light of the mutual interference produced by the gyro effect between the movements of $\bar{\theta}_y$ and $\bar{\theta}_x$, in order to arrange the optimum state feedback compensating mechanism 38, the inverse symmetrical cross-linking feedback, that is $P_{14}^*\bar{\theta}$ and $-P_{14}^*\bar{\theta}$ are required.

The function of the inverse symmetrical cross-linking feedback is as follows: When the rotating body is rotating at relatively high speed, if any control operation is not provided, the rotating axis carries out the movement combining the precession and the nutation. The nutation will be decreased by providing a relatively small damping. In the optimum state feedback compensating mechanism 38, the portion of $P_{22}^*S$ effects the damping motion. The precession is a motion of rotating with respect to the Z axis while keeping the angle between the rotating axis and the Z axis. If the rotating axis is inclined to a certain direction by a disturbance, the direction of the incline of the rotating axis rotates in a predetermined direction as time is passed. Therefore, for the attenuation of the precession, it is effective to apply the torque around the X axis (Y axis) to the rotating body in accordance with the magnitude of $\bar{\theta}_y (\bar{\theta}_x)$ so as to disturb the rotation of the rotating axis. In this manner, the optimum state feedback compensating mechanism 38 produces a feedback control signal corresponding to the angular displacement or deviation of the controlled object to compensate for the gyro effect and such is achieved by the inverse symmetrical cross-linking feedback, that is, the portions of $P_{14}^*\bar{\theta}_x$ and $-P_{14}^*\bar{\theta}_y$.

Figure 8:
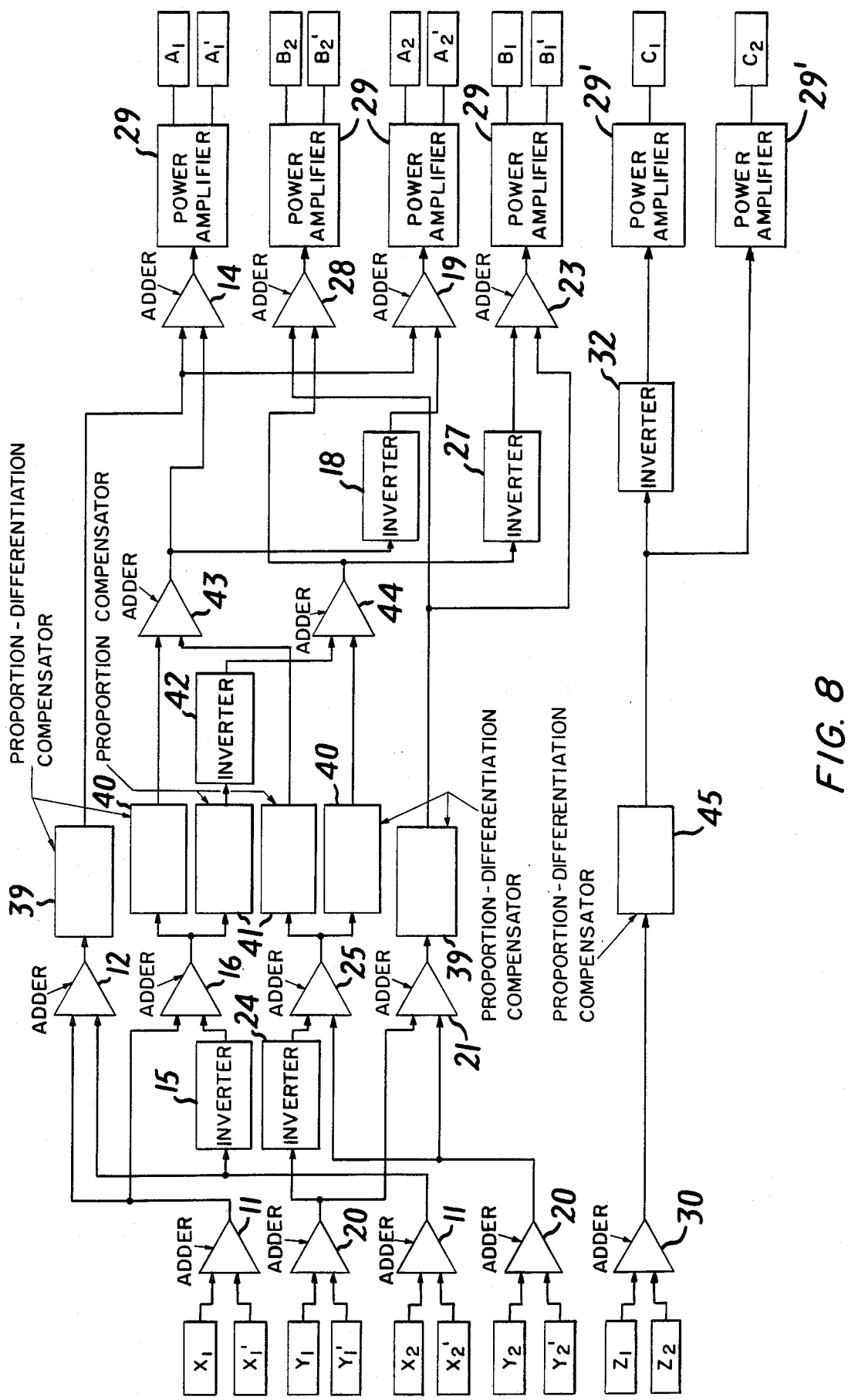
FIG. 8 is a circuit diagram showing one example of the circuit arrangement of the present invention.

In FIG. 8, a more detailed embodiment of the circuit is shown and, in the figure, 39 and 45 are proportion-differentiation compensators which correspond to the feedback compensator 36. 40 is a proportion-differentiation compensator which corresponds to $P_{12}^* + P_{22}^*S$ of the optimum feedback compensating mechanism 38. 41 is a proportion compensator which corresponds to $P_{14}^*$ of the optimum feedback compensating mechanism 38, and 42 is an inverter.

Figure 9:
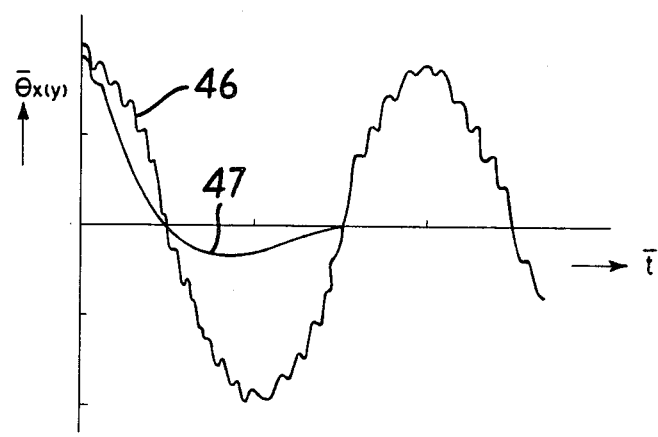
FIG. 9 is a view showing the response waveform.

As described above, according to the present invention, it is possible to quickly suppress the precession or the nutation caused by the gyro effect. One example of the result of numerical simulation is shown in FIG. 9. In the figure, 46 is the response waveform in the system which does not have the compensating mechanism and 47 is the response waveform in the system having it. It is obvious that the suppression of the precession and the nutation caused by the gyro effect is carried out quickly by using the optimum condition feedback mechanism 38. Furthermore, according to the design technique of the present invention, when the parameters of an object to be controlled have various values, the parameter of the compensating mechanism is gained by carrying out the calculation in accordance with the established calculating procedure, so it is possible to quickly design the control device.

We claim:

1. A magnetic bearing apparatus for rotatably supporting a rotatable body comprising: radial magnetic bearings each having at least two pairs of electromagnets surrounding the rotatable body, and arranged at suitable distances along the rotatable body; radial sensors surrounding the rotatable body and arranged at suitable distances along the rotating body to detect radial deviation of the rotatable body at each sensor; first optimum regulating means for one degree of freedom for extracting the radial deviation of the rotatable body from the output signal of said sensors and for generating a first control signal corresponding to the deviation; second optimum regulating means for two degrees of freedom including inverse symmetrical cross-linking feedback means for extracting the angular deviation of the rotatable body on the perpendicular radial axis from the output signal of said sensors and for generating a second control signal corresponding to gyro action caused by the compensating torque on the perpendicular radial axis for the angular deviation; and control means for controlling the input power applied to said electromagnets in response to said first and second control signals.

2. A magnetic bearing apparatus having five degrees of freedom for rotatably supporting an elongate rotationally driven rotatable body comprising: two radial magnetic bearings disposed in spaced relation along the rotatable body for rotatably supporting the body for rotation about a rotary axis, each radial magnetic bearing comprising at least two pairs of energizeable electromagnets with the electromagnets of each pair being disposed opposite one another with the rotatable body disposed in between; radial sensing means for sensing radial deviation of the rotatable body from the rotary axis at two separate and spaced locations along the rotatable body and providing corresponding output signals indicative of the extent of radial deviation at each of the two locations; first optimum regulating means for one degree of freedom for extracting from the output signals information representative of the radial deviation at the two locations and developing a corresponding first control signal; second optimum regulating means for two degrees of freedom including inverse symmetrical cross-linking feedback means for extracting from the output signals information representative of the angular deviation of the rotatable body at the two locations and developing a corresponding second control signal effective to compensate for the gyro-effect; and control means responsive to the first and second control signals for controlling energization of the electromagnets.

* * * * *